United States Patent
Wang

(10) Patent No.: US 11,196,674 B2
(45) Date of Patent: Dec. 7, 2021

(54) MESSAGE TYPE MAPPING FOR PACKET TRAFFIC PRIORITIZATION

(71) Applicant: T-Mobile USA, Inc., Bellevue, WA (US)

(72) Inventor: Jun Wang, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 46 days.

(21) Appl. No.: 16/186,294

(22) Filed: Nov. 9, 2018

(65) Prior Publication Data

US 2020/0153741 A1    May 14, 2020

(51) Int. Cl.
*H04L 12/851*    (2013.01)
*H04W 72/10*    (2009.01)
*H04W 84/04*    (2009.01)
*H04W 88/08*    (2009.01)

(52) U.S. Cl.
CPC .............. *H04L 47/24* (2013.01); *H04W 72/10* (2013.01); *H04W 84/042* (2013.01); *H04W 88/08* (2013.01)

(58) Field of Classification Search
CPC ............... H04W 72/10; H04W 84/042; H04W 28/0268; H04W 88/08; H04L 47/24; A61B 10/0233; A61B 5/14514; A61B 5/14532; A61B 5/1486; C04B 2103/408; C04B 2111/00637; C04B 24/2611; C04B 24/2623; C04B 40/0039; C12Q 1/006; G01N 27/3272; G01N 27/3273; G01N 33/49
See application file for complete search history.

(56) References Cited

U.S. PATENT DOCUMENTS

| 8,908,636 | B2 * | 12/2014 | Klingenbrunn ..... | H04L 47/2491 370/331 |
| 2014/0204754 | A1 * | 7/2014 | Jeong ................ | H04W 28/0289 370/235 |
| 2016/0212654 | A1 * | 7/2016 | Itoh ........................ | H04W 40/12 |

(Continued)

FOREIGN PATENT DOCUMENTS

| WO | 2017026760 A1 | 2/2017 |
| WO | 2017151437 A1 | 9/2017 |

OTHER PUBLICATIONS

European Patent Application No. 19207410.2, Search Report dated Feb. 19, 2020, 9 pages.

(Continued)

*Primary Examiner* — Zhensheng Zhang
(74) *Attorney, Agent, or Firm* — Han Santos, PLLC

(57) ABSTRACT

Techniques that enable user plane data to be carried by control plane messages and still be correctly recognized and prioritized as user plane data in a packet network are provided. A base station of cellular network receives a message from a user equipment (UE). The base station transmits a packet based on the received message over a packet network to a control plane component of the cellular network. When the UE data includes user plane data, the base station sets a differentiated services code point (DSCP) marking of the packet so the packet is prioritized as user plane data in the packet network. When the received message does not include user plane data, the base station sets the DSCP marking of the packet so the packet is prioritized as control plane data.

18 Claims, 6 Drawing Sheets

(56) References Cited

U.S. PATENT DOCUMENTS

2018/0070371 A1* 3/2018 Shin ................... H04L 5/0044
2018/0324633 A1   11/2018 Lee et al.
2019/0325718 A1* 10/2019 Couturier ............. G08B 25/10
2020/0097277 A1* 3/2020 Gupta ..................... G06F 8/65

OTHER PUBLICATIONS

Huawei et al.: "EPC impact analysis of different Relay alternatives", 3GPP Draft; R3-092185, 3rd Generation Partnership Project (3GPP), Mobile Competence Centre; 650, Route Des Lucioles; F-06921 Sophia-Antipolis Cedex; France, No. Miyazaki; Oct. 12, 2009, Oct. 12, 2009 (Oct. 12, 2009), XP050391735, [retrieved on Oct. 2, 2009].

European Patent Application No. 19207410.2, Office Action dated Mar. 29, 2021, 6 pages.

* cited by examiner

MESSAGE TYPE MAPPING FOR PACKET TRAFFIC PRIORITIZATION

BACKGROUND

Network and Communications technologies such as the 3rd Generation Partnership Project (3GPP) employ protocols and interfaces between network nodes to have a separate control plane for carrying system generated control data and a user plane for carrying data generated by user applications. The control plane and the user plane have very different characteristics, e.g. tolerance of error and delay, expected bit rates, etc. Network nodes can use Differentiated Services Code Point (DSCP) marking embedded in IP packets to recognize different payload types and prioritize the IP packets accordingly.

Narrow Band Internet of Things (NB-IoT) is a Low Power Wide Area Network (LPWAN) radio technology standard developed by 3GPP to enable a wide range of cellular devices and services. NB-IoT focuses specifically on indoor coverage, low cost, long battery life, and high connection density. NB-IoT uses a subset of the specifications of the Long-Term Evolution (LTE) standard but limits the bandwidth to a single narrowband of 200 kHz. For example, NB-IoT uses Orthogonal Frequency Division Multiplexing (OFDM) modulation for downlink communications and Single Carrier Frequency Division Multiplexing Access (SC-FDMA) for uplink communications. In NB-IoT, user plane data is carried by the control plane, so the underlying packet network is unable to use the DSCP marking used for the control plane to recognize if the packet network is carrying signaling or NB-IoT user plane data.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to systems and techniques that enable user plane data to be carried by control plane messages and still be correctly recognized and prioritized as user plane data in a packet network.

In some embodiments, a base station of a cellular network receives a message from a user equipment (UE). The base station transmits a packet based on the received message over a packet network to a control plane component of the cellular network. When a message type of the received message indicates that the message includes user plane data, the base station sets a differentiated services code point (DSCP) marking of the packet so the packet is prioritized as user plane data in the packet network. When a message type of the received message indicates that the message does not include user plane data, the base station sets the DSCP marking so the packet is prioritized as control plane data. By setting the DSCP marking based on the message type, the base station enables the packet network to recognize user plane data embedded in control plane messages and to correctly prioritize the packet traffic from the base station.

Figure 1B:
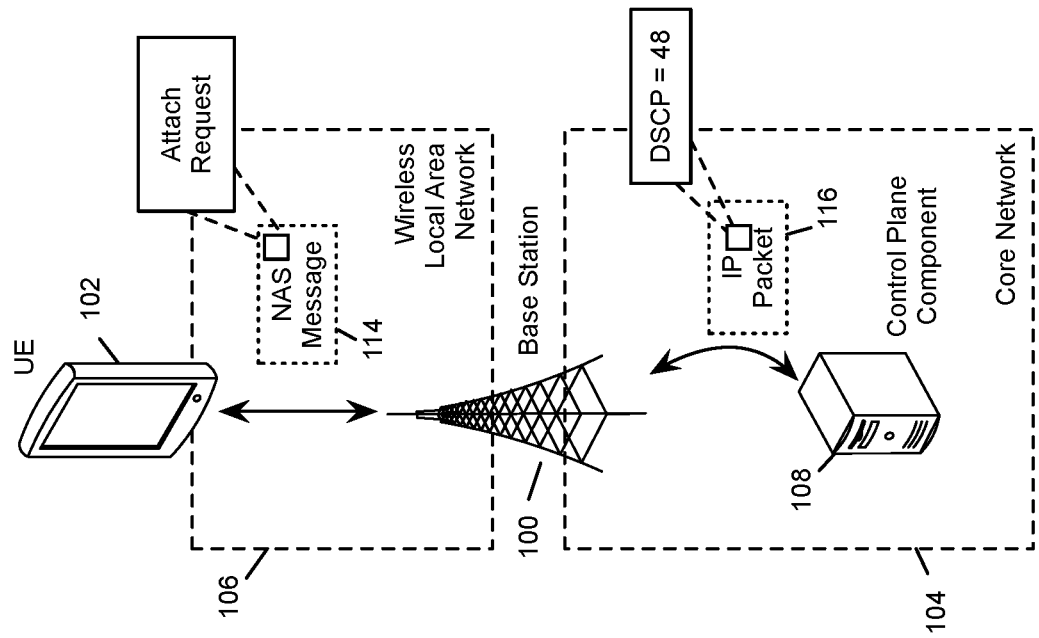
FIGS. 1a and 1b conceptually illustrate a base station setting Differentiated Services Code Point (DSCP) for transmitting packets in a core network.
Figure 1A:
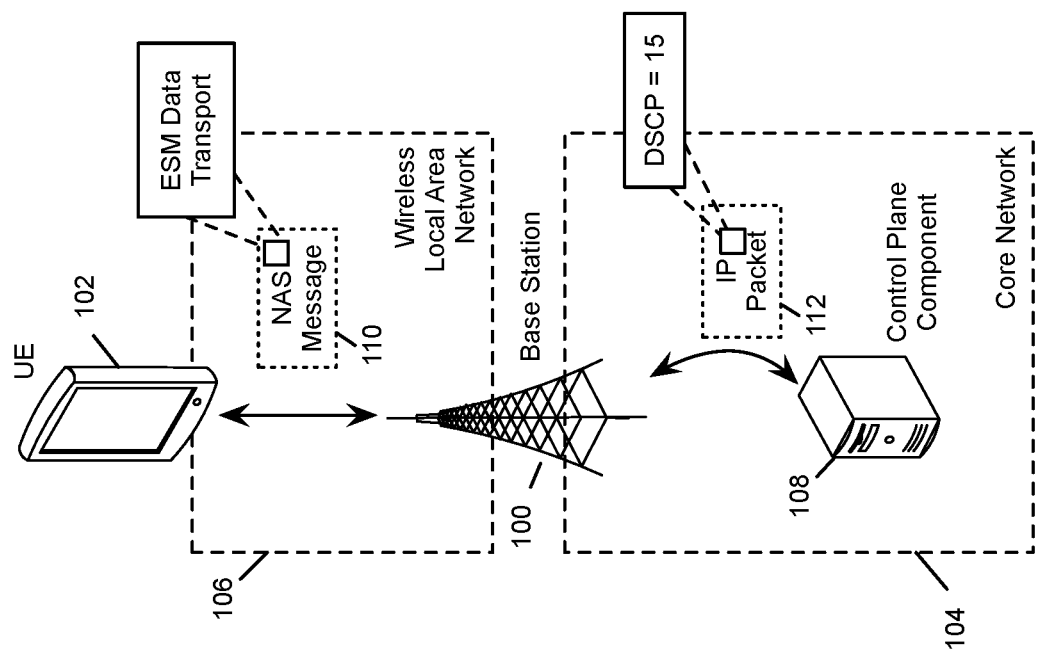

FIGS. 1a and 1b conceptually illustrate a base station 100 that sets DSCP markings for transmitting a message from a UE to a control plane component in a core network. The DSCP marking enables the user plane data carried by control plane messages to be appropriately prioritized as user plane data in a packet network. As illustrated, the base station 100 provides connectivity to a wireless local area network 106 to various UEs, including a UE 102. The wireless local area network 106 provided by the base station 100 enables the UE 102 (and other UEs) to communicate with a core network 104.

The base station 100 is a base station or a hotspot of a wireless network. The base station 100 may be an Evolved Node B (eNodeB) of a cellular network, such as an LTE network. The base station 100 also supports a Low Power Wide Area Network (LPWAN), such as the Narrow Band Internet of Things (NB-IoT).

The UE 102 may be a smart phone, a computer, a mobile device, or a device that is capable of wireless communication. The UE 102 may also be a stationary device (a meter, a light, a household appliance, etc.) that is part of an NB-IoT.

The core network 104 includes routers, switches, or other types of data forwarding elements for conducting data traffic (e.g., packet traffic) between various network endpoints such as UEs, base stations, hotspots, and other types of computing resources. The core network 104 also provides access to external networks such as the Internet. The core network 104 may include components that provide services to the subscribers of a cellular network as well as tracking positions of the UEs. The core network 104 may include a packet network, e.g., an Evolved Packet Core (EPC) that interconnects different components belonging to an Evolved Packet System (EPS). EPC is a framework for providing converged voice and data on a 4G LTE network. EPC unifies voice and data on an Internet Protocol (IP) service architecture and voice is treated as just another IP application. This allows operators to deploy and operate one packet network for 2G, 3G, wireless local area network (WLAN), and fixed access such as Ethernet, DSL, cable, and fiber.

The UE 102 may communicate with the base station 100 by Non-Access Stratum (NAS) messages. NAS messages are control plane messages to and from control plane components of the core network 104. The control plane messages may include messages for EPS Mobility Management (EMM) and EPS Session Management (ESM).

As illustrated, the base station 100 relays different types of NAS messages between the UE 102 and a control plane component 108 of the core network 104. Table 1 below is a list of message types for EMM. Table 2 below is a list of message types for ESM.

TABLE 1

Message Types for EPS Mobility Management (EMM)

| | |
|---|---|
| 01000001 | Attach request |
| 01000010 | Attach accept |
| 01000011 | Attach complete |
| 01000100 | Attach reject |
| 01000101 | Detach request |
| 01000110 | Detach accept |
| 01001000 | Tacking area update request |
| 01001001 | Tracking area update accept |
| 01001010 | Tracking area update complete |
| 01001011 | Tracking area update reject |
| 01001100 | Extend service request |
| 01001101 | Control plane service request |
| 01001110 | Service reject |
| 01001111 | Service accept |
| 01010000 | GUTI reallocation command |
| 01010001 | GUTI reallocation complete |
| 01010010 | Authentication request |
| 01010011 | Authentication response |
| 01010100 | Authentication reject |
| 01010101 | Identity request |
| 01010110 | Identity response |
| 01011101 | Security mode command |
| 01011110 | Security mode complete |
| 01011111 | Security mode reject |
| 01100000 | EMM status |
| 01100001 | EMM information |
| 01100010 | Downlink NAS transport |
| 01100011 | Uplink NAS transport |
| 01100100 | CS Service notification |
| 01101000 | Downlink generic NAS transport |

TABLE 2

Message Types for EPS Session Management (EMS)

| | |
|---|---|
| 11000001 | Activate default EPS bearer context request |
| 11000010 | Activate default EPS bearer context accept |
| 11000011 | Activate default EPS bearer context reject |
| 11000101 | Activate dedicated EPS bearer context request |
| 11000110 | Activate dedicated EPS bearer context accept |
| 11000111 | Activate dedicated EPS bearer context reject |
| 11001001 | Modify EPS bearer context request |
| 11001010 | Modify EPS bearer context accept |
| 11001011 | Modify EPS bearer context reject |
| 11001101 | Deactivate EPS bearer context request |
| 11001110 | Deactivate EPS bearer context accept |
| 11010000 | PDN connectivity request |
| 11010001 | PDN connectivity reject |
| 11010010 | PDN disconnect request |
| 11010011 | PDN disconnect reject |
| 11010100 | Bearer resource allocation request |
| 11010101 | Bearer resource allocation reject |
| 11010110 | Bearer resource modification request |
| 11010111 | Bearer resource modification reject |
| 11011001 | ESM information request |
| 11011010 | ESM information response |
| 11011011 | Notification |
| 11011100 | ESM dummy message |
| 11101000 | ESM status |
| 11101001 | Remote UE report |
| 11101010 | Remote UE report response |
| 11101011 | ESM data transport |

Upon receiving an NAS message with an EMM (Table 1) or ESM (Table 2) message type, the base station 100 transmits a packet to the control plane component 108. When relaying NAS messages between the UE 102 and the control plane component 108, the base station 100 maps different message types to different DSCP markings in packet headers. The packet network of the core network 104 may in turn use the DSCP markings to prioritize the delivery of the packets. Specifically, when the message type indicates that the content of the message includes user plane data, the base station sets the DSCP marking to indicate user plane data. An example message type for user plane data is message type "11101011" or "ESM data transport", which is a user data transport that carries user plane data between the control plane component 108 and the base station 100. On the other hand, when the message type is one of the other possible values of EPS Mobility Management or EPS Mobility Management session as shown in Table 1 or Table 2, the base station 100 sets the DSCP marking to indicate control plane data.

FIG. 1*a* illustrates the base station 100 setting the DSCP markings when the message type of the NAS message 110 is "11101011" or "ESM data transport". The message type "ESM data transport" indicates that the content of the NAS message is user plane data rather than control plane data. Upon receiving the NAS message 110, the base station 100 sends the content of the NAS message 110 in a packet 112 to the control plane component 108. The DSCP marking of the packet 112 is set to a value "15" in this example, which is a value assigned to certain types of user plane data packets. The core network 104 correspondingly prioritizes the delivery of the packet 112 based on the DSCP marking (e.g., lower latency, higher drop probability).

FIG. 1*b* illustrates the base station 100 setting the DSCP markings when the message type of the NAS message 114 is "01000001" or "Attach Request". The message type "Attach Request" indicates that the content of the NAS message is control plane data. Upon receiving the NAS message 114, the base station sends the content of the NAS message in a packet 116 to the control plane component 108. The DSCP marking of the packet 116 is set to a value "48" in this example, which is a value assigned to certain types of control plane data packets. The core network 104 correspondingly prioritizes the delivery of the packet 116 based on the DSCP marking (e.g., higher latency, lower drop probability).

Figure 2:
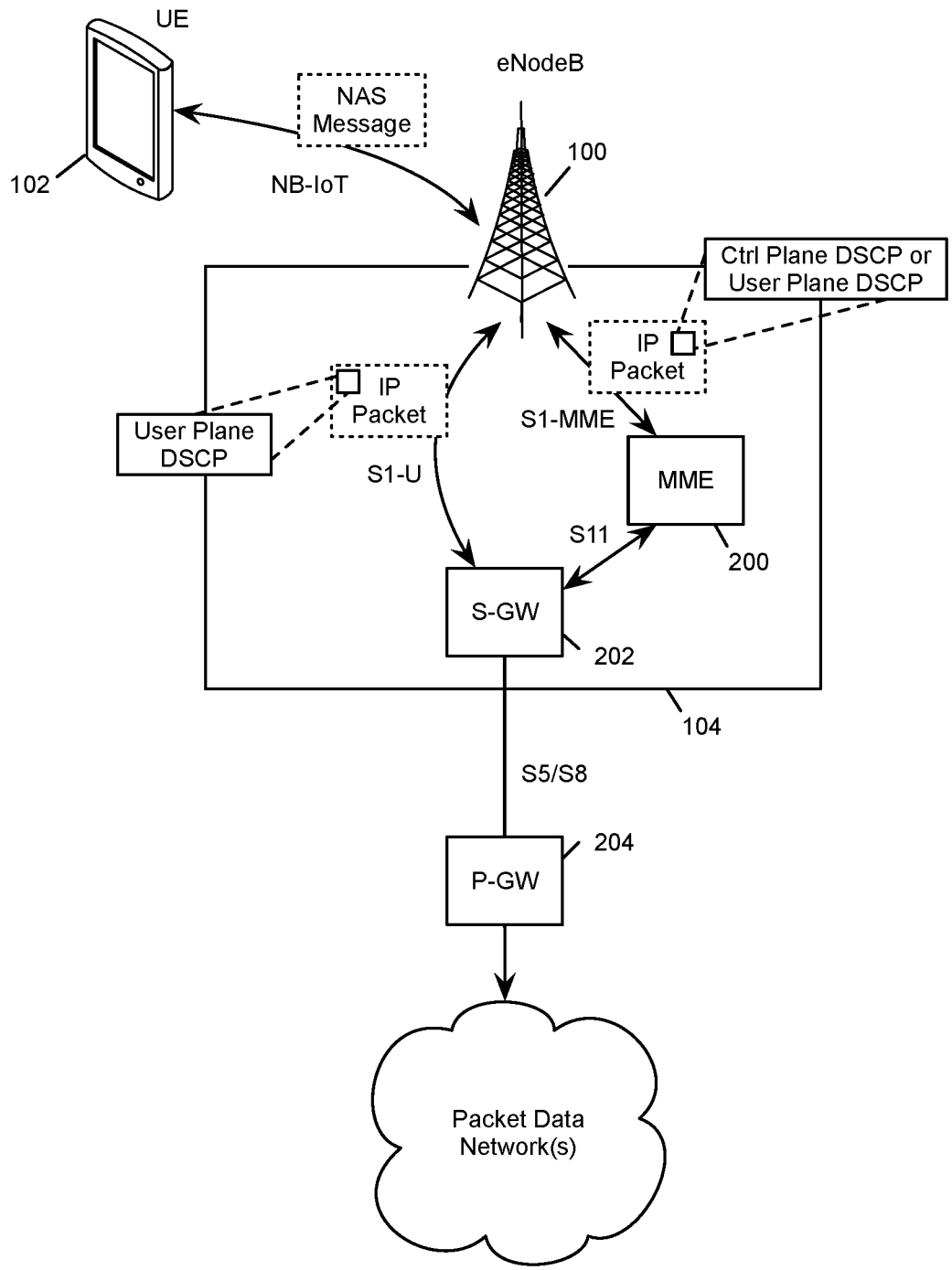
FIG. 2 illustrates components of the core network that uses the DSCP marking to prioritize packet traffic.

FIG. 2 illustrates components of the core network 104 that use the DSCP marking to prioritize packet traffic from the base station 100. The core network 104 includes an LTE EPC, which includes several components such as a Mobility Management Entity (MME) 200, a Serving Gateway (S-GW) 202, a Packet Data Node Gateway (P-GW) 204, and other components (not illustrated). The base station 100 is connected to the S-GW 202 through a S1-U interface and the MME 200 through a S11-MME interface. The MME is connected to the S-GW 202 through an S11 interface. The S-GW 202 is connected to the P-GW 204 through a S5 or S8 interface.

The MME 200 is a control plane component that manages session states and authenticates and tracks a user across the cellular network. The MME retains location information at the tracking area level for the subscribing UEs of the cellular network, such as the UE 102. The MME is also responsible for part of the handover signaling between LTE and 2G/3G/5G networks.

The S-GW 202 resides in the user plane where it forwards and routes packets between the eNodeB base stations (e.g., the base station 100) and the P-GW 204. The P-GW 204 acts as the interface between the LTE network and other packet data networks and manages quality of service (QoS) and provides deep packet inspection (DPI).

The MME 200 may forward some of the data that it receives from the base station 100 to the S-GW 202. The base station 100 may also directly communicate user plane data to the S-GW 202 through the S1-U interface. Some of the data communicated to the S-GW 202 is in packets with user plane DSCP markings. The S-GW 202 forwards the received packets to the P-GW 204 through the S5 or S8 interface into a Packet Data Network (PDN), such as the Internet.

The base station 100 receives NAS messages from the UE 102. An NAS message may include ESM or EMM data destined for the MME 200. Upon receiving the NAS messages, the base station 100 transmits packets based on the ESM or EMM data to the MME 200 through an S1-MME interface. The base station 100 inserts a DSCP marking based on the message type. For example, if the message type is a type of user plane data transport, e.g., "ESM data transport", the base station 100 would set the DSCP marking to a user plane DSCP. Otherwise, the DSCP marking would be set to a control plane DSCP.

Example Base Station

Figure 3:
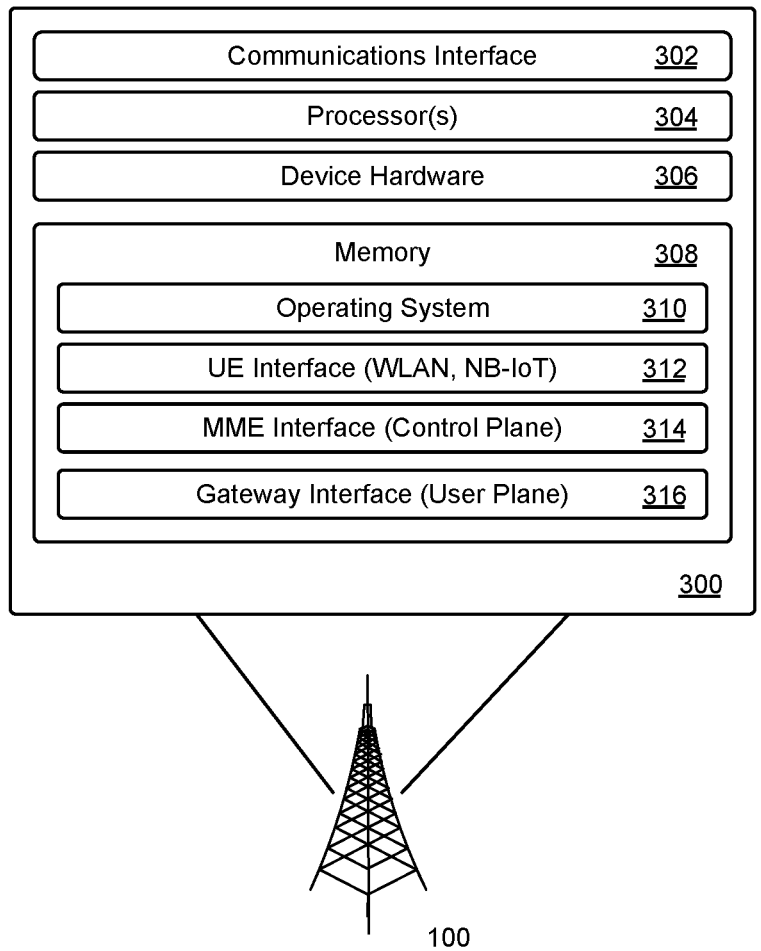
FIG. 3 is a block diagram showing various components of an example computing device implementing the base station that sets DSCP markings according to message types.

FIG. 3 is a block diagram showing various components of an example computing device 300 implementing the base station 100 that sets DSCP markings according to message types. The base station computing device 300 may be a general-purpose computer, such as a desktop computer, tablet computer, laptop computer, or any type of server that is capable of receiving inputs, processing the inputs, and generating output data. The computing device 300 may also be a virtual computing device in the form of virtual machines or software containers that are hosted in a cloud.

The computing device 300 may be equipped with a communications interface 302, one or more processors 304, device hardware 306, and memory 308. The communications interface 302 may include wireless and/or wired communications components that enable the computing devices to transmit data to and receive data from other devices, whether through a dedicated wired connection or via a communications network. The device hardware 306 may include additional hardware that performs user interface, data display, data communication, data storage, and/or other server functions.

The memory 308 may be implemented using computer-readable medium, such as a computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device. In contrast, communications media may embody computer-readable instructions, data structures, program modules, or other data in a modulated data signal, such as a carrier wave, or other transmission mechanism.

The processor(s) 304 and the memory 308 of the computing devices 300 may implement an operating system 310, a UE interface 312, an MME interface 314, and a gateway interface 316. The operating system 310 may include components that enable the computing devices 300 to receive and transmit data via various interfaces (e.g., user controls, communications interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The UE interface 312 is a software component that is responsible for receiving data from and sending data to UEs through a wireless network. The UE interface 312 may exchange data with a UE through a radio access network of a cellular network. The UE interface 312 may also exchange data with a UE through LPWAN or NB-IoT. The UE interface also examines the message types of the uplink messages (e.g., NAS messages) from the UE to determine whether the messages are for the MME (such as ESM or EMM messages). Messages that are destined for the MME are handled by the MME interface 314. Messages that are not destined for the MME are handled by the gateway interface 316.

The MME interface 314 is a software component that is responsible for exchanging control plane data with the MME 200, which is a control plane component. The MME interface 314 transmit packets to the MME based on content of the messages received from the UE interface 312. The MME interface 314 also sets the DSCP markings of the transmitted packets based on the message types of the received messages. For example, when the message type indicates "ESM data transport", the MME interface 314 would set the DSCP marking to a user plane DSCP value. In some embodiments, the MME interface 314 communicates with the MME by operating an S1-MME interface.

The gateway interface 316 is a software component that is responsible for communicating user plane data with the S-GW 202, which is a user plane component. In some embodiments, the gateway interface 316 communicates with the S-GW 202 by operating an S1-U interface.

Figure 4:
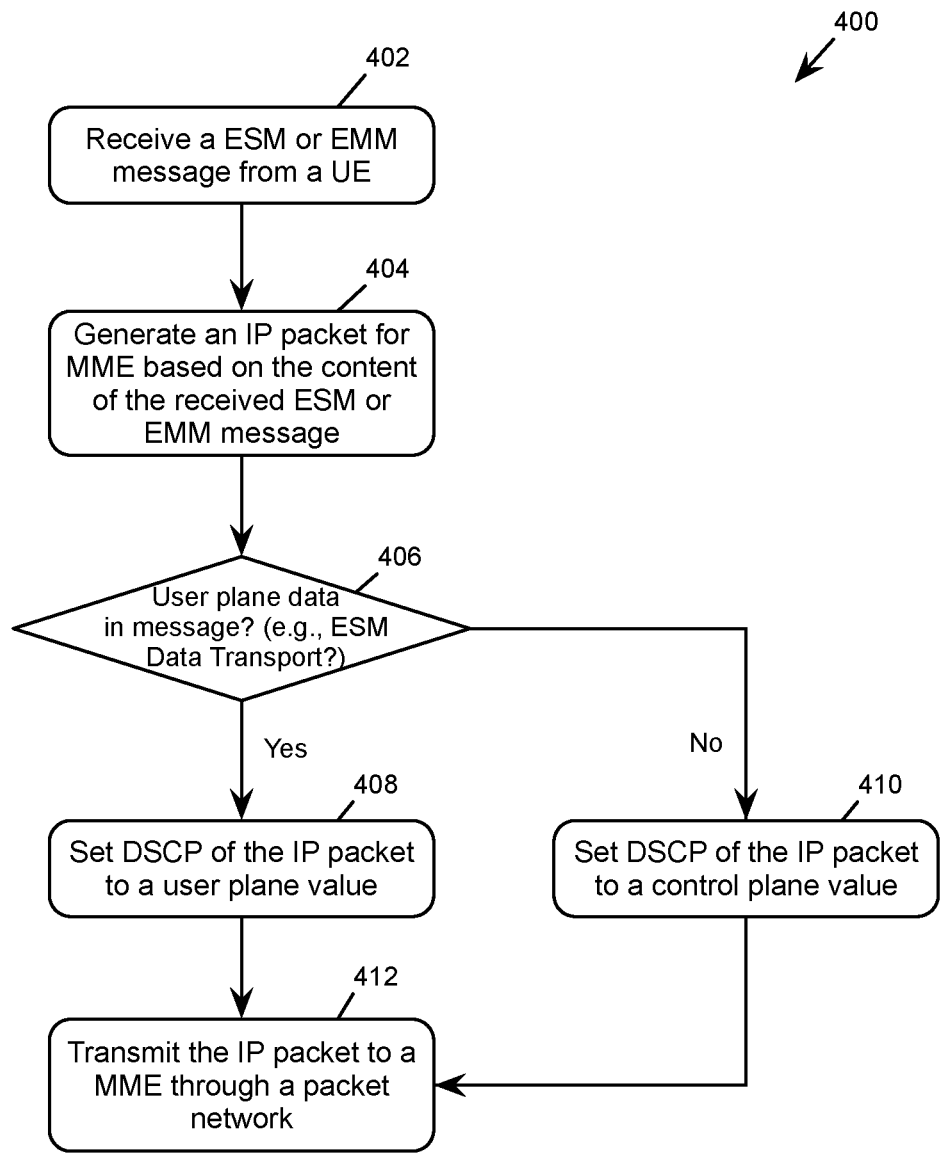
FIG. 4 conceptually illustrates a flow diagram of an example process performed by the base station to set DSCP markings according to message types.

FIG. 4 conceptually illustrates a flow diagram of an example process 400 performed by the base station 100 to set DSCP markings according to message types. The base station relays uplink messages from UEs to the MME of the core network and inserts DSCP markings into packets based on the message types of the uplink messages. The process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 402, the base station receives an ESM or EMM message. The base station may receive the ESM or EMM message from a UE as an NAS message. The base station may determine whether the NAS message is an ESM or an EMM message by examining the message type of the message.

At block 404, the base station generates a packet destined for the MME based on the content of the ESM or the EMM messages. At block 406, the base station determines whether the message contains user plane data. For example, the base station may determine that the message contains user plane data when the message type of the message indicates that the message is an ESM data transport message. Thus, if the message type indicates user plane data, the process proceeds to block 408. Otherwise, the process proceeds to block 410.

At block 408, the base station sets the DSCP marking of the packet to a value for user plane data, which prioritizes the delivery of the packet as a user plane packet. The process then proceeds to block 412.

At block 410, the base station sets the DSCP marking of the packet to a value for control plane data, which prioritizes the delivery of the packet as a control plane packet. The process then proceeds to block 412.

At block 412, the base station transmits the packet to the MME through a packet network. The DSCP marking is used by the packet network to prioritize the delivery of the transmitted packet.

Example WE

As mentioned above, for uplink EMM or ESM messages from the UE 102 to the MME 200, the base station 100 inserts the DSCP marking based on message type.

In some embodiments, for downlink EMM and ESM messages from the MME 200 to the UE 102, the MME 200 inserts the DSCP marking based on message type.

Figure 5:
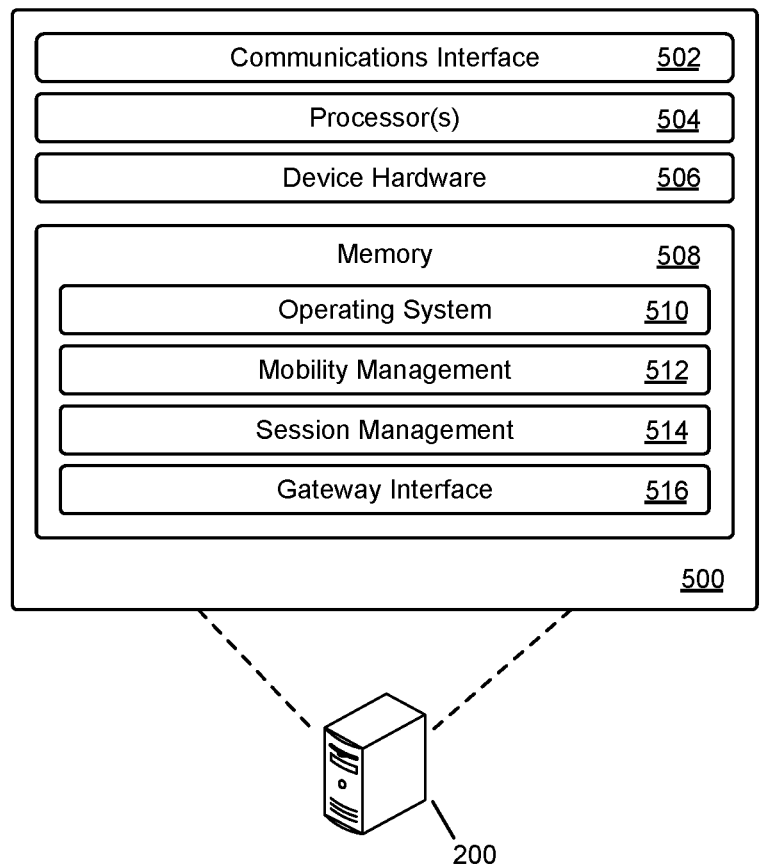
FIG. 5 is a block diagram showing various components of an example computing device implementing a Mobility Management Element (MME) that sets DSCP markings according to message types.

FIG. 5 is a block diagram showing various components of an example computing device 500 implementing the MME 200, which sets DSCP markings according to message types. The MME computing device 500 may be a general-purpose computer, such as a desktop computer, tablet computer, laptop computer, server, or other electronic devices that are capable of receiving inputs, processing the inputs, and generating output data. The computing device 500 may also be a virtual computing device in the form of virtual machines or software containers that are hosted in a cloud.

The computing device 500 may be equipped with a communications interface 502, one or more processors 504, device hardware 506, and memory 508. The communications interface 502 may include wireless and/or wired communications components that enable the computing devices to transmit data to and receive data from other devices, whether through a dedicated wired connection or via a communications network. The device hardware 506 may include additional hardware that performs user interface, data display, data communication, data storage, and/or other server functions.

The memory 508 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communications media may embody computer-readable instructions, data structures, program modules, or other data in a modulated data signal, such as a carrier wave, or other transmission mechanisms.

The processor(s) 504 and the memory 508 of the computing devices 500 may implement an operating system 510, an EPS mobility management module 512, an EPS session management module 514, and a gateway interface 516. The operating system 510 may include components that enable the computing devices 500 to receive and transmit data via various interfaces (e.g., user controls, communications interface, and/or memory input/output devices), as well as process data using the processor(s) 504 to generate output. The operating system 510 may include a presentation component that presents the output (e.g., display the data on an electronic display, store the data in memory, transmit the data to another electronic device, etc.). Additionally, the operating system 510 may include other components that perform various additional functions generally associated with an operating system.

The mobility management module 512 is a software component that is responsible for tracking the location of UEs and for part of the handover signaling between LTE and 2G/3G/5G networks. The mobility management module 512 is also responsible for handling EMM messages with UEs through base stations. The mobility management module 512 receives and transmits messages with base stations through the S1-MME interface. The mobility management module 512 also sets the DSCP marking for packets headed to base stations and UEs.

The session management module 514 is a software component that is responsible for initiating paging and authentication of subscribing UEs. The session management module 514 is also responsible for handling ESM messages with UEs through base stations. The mobility management module 512 receives and transmits ESM messages with base stations through the S1-MME interface. The mobility management module 512 also sets the DSCP marking for packets headed to base stations and UEs. For example, the DSCP marking is set to a user plane value when the message type indicates "ESM data transport".

The gateway interface 516 is a software component that is responsible for communicating with a gateway element of the core network, such as the S-GW 202 or the P-GW 204. In some embodiments, the gateway interface 516 communicates with the S-GW 202 by operating an S1-U interface. In some embodiments, that base station may send user plane data embedded in ESM or EMM messages to a gateway element.

Figure 6:
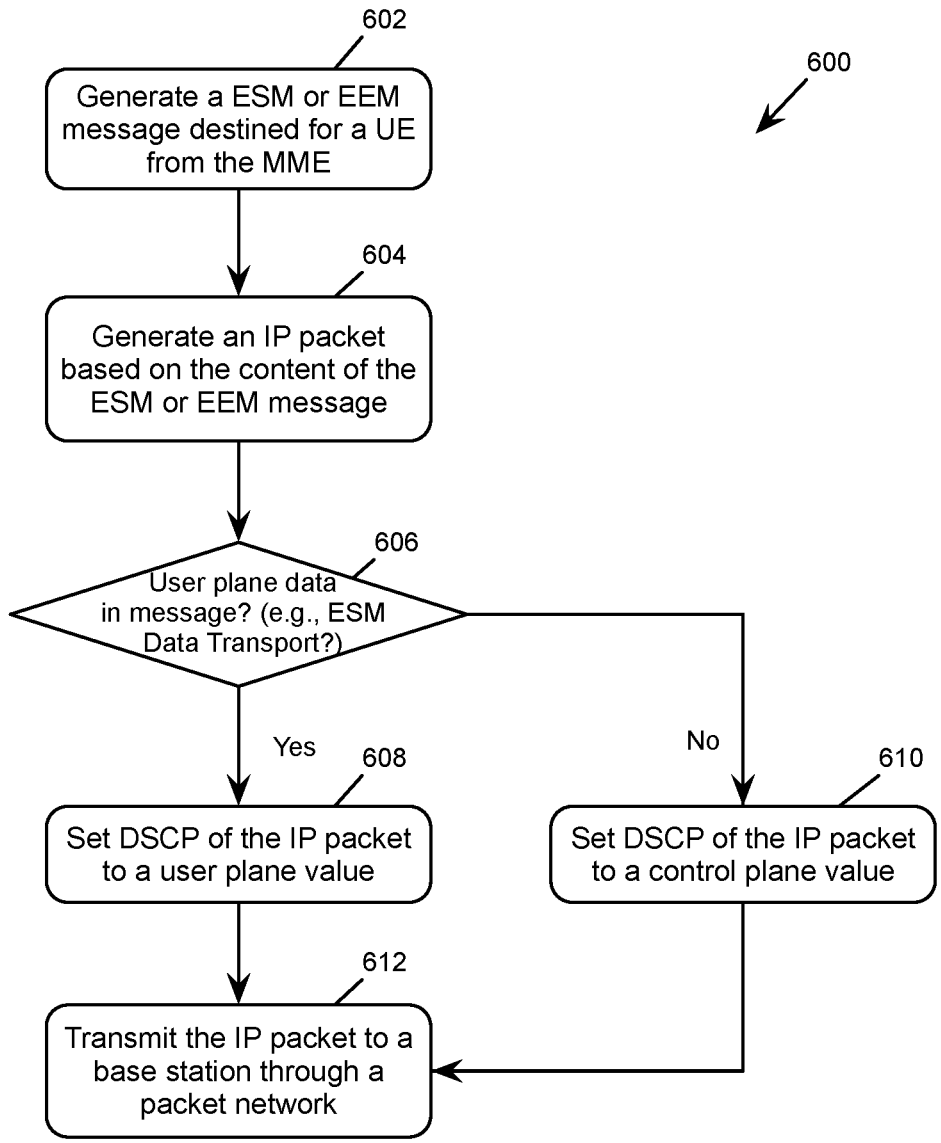
FIG. 6 conceptually illustrates a flow diagram of an example process performed by the MME to set DSCP markings according to message types.

FIG. 6 conceptually illustrates a flow diagram of an example process 600 performed by the MME 200, which sets DSCP markings according to message types. The MME 200 may send downlink messages to UEs through base stations and insert DSCP markings into packets based on the message types of the downlink messages.

The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 602, the MME 200 generates or receives a message destined for a UE. The message may be an ESM message or an EEM message. At block 604, the MME 200 generates a packet based on the content of the EEM or ESM message.

At block 606, the MME 200 determines whether the message contains user plane data, for example, by examining whether the message type is "ESM data transport". If the message type indicates user plane data (such as when the message type is "ESM data transport"), the process proceeds to block 608. Otherwise, the process proceeds to block 610.

At block 608, the MME 200 sets the DSCP marking of the packet to a value for user plane data, which prioritizes the delivery of the packet as a user plane packet. The process then proceeds to block 612 to transmit the packet to a base station through the packet network.

At block 610, the MME 200 sets the DSCP marking of the packet to a value for control plane data, which prioritizes the delivery of the packet as a control plane packet. The process then proceeds to block 612 to transmit the packet to the MME through the packet network.

At block 612, the MME transmits the packet to a base station through a packet network. The DSCP marking is used by the packet network to prioritize the delivery of the transmitted packet.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
one or more processors; and
a non-transitory computer-readable medium storing a plurality of computer-executable instructions that are executable by the one or more processors to perform a plurality of actions, the plurality of actions comprising:
receiving, at a base station of a cellular network, a non-access stratum (NAS) message from a user equipment (UE);
determining, at the base station, that a message type of the NAS message is an evolved packet system session management (ESM) data transport that carries user plane data;
based on determining that the message type of the NAS message is the ESM data transport that carries user plane data, generating, at the base station, a packet that includes at least a portion of the NAS message;
based on determining that the message type of the NAS message is the ESM data transport that carries user plane data, setting, at the base station, a Differentiated Services Code Point (DSCP) marking of the packet that indicates the packet includes the portion of NAS message that is the ESM data transport that carries user plane data; and
transmitting, by the base station, the packet that includes the DSCP marking that indicates the packet includes the portion of NAS message that is the ESM data transport that carries user plane data and that indicates a priority of the packet over a packet network to a mobility management element (MME) of the cellular network that authenticates UEs in the cellular network.

2. The computing device of claim 1, wherein the MME is a control plane component that tracks positions of UEs in the cellular network.

3. The computing device of claim 1, wherein the message from the UE is received over a low power wide area network.

4. The computing device of claim 3, wherein the low power wide area network is a narrow band wireless network.

5. The computing device of claim 1, wherein the actions comprise:
receiving, at the base station, an additional message from the UE;
determining, at the base station, that the additional message includes control plane data;
generating, at the base station, an additional packet that includes at least a portion of the additional message;
based on determining that the additional message includes control plane data, setting, at the base station, an additional DSCP marking of the additional packet that indicates the additional packet includes control plane data; and
transmitting, by the base station, the additional packet that includes the additional DSCP marking that indicates the additional packet includes control plane data and that indicates a priority of the additional packet over the packet network to the MME of the cellular network that authenticates UEs in the cellular network.

6. The computing device of claim 1, wherein the actions comprise:
receiving, at the base station, an additional NAS message from the UE;
determining, at the base station, that a message type of the additional NAS message is an Attach Request that indicates that the additional NAS message includes control plane data;
based on determining that the message type of the additional NAS message is the Attach Request that indicates that the additional NAS message includes control plane data, generating, at the base station, an additional packet that includes at least a portion of the additional NAS message;
based on determining that the message type of the additional NAS message is the Attach Request that indicates that the additional NAS message includes control plane data, setting, at the base station, an additional DSCP marking of the additional packet that indicates the packet includes the portion of the additional NAS message that is the Attach Request that carries the control plane data; and
transmitting, by the base station, the additional packet that includes the DSCP marking that indicates the additional packet includes the portion the additional NAS message that is the Attach Request that caries the control plane data and that indicates a priority of the additional packet over the packet network to the MME of the cellular network that authenticates UEs in the cellular network.

7. A computer-implemented method, comprising:
receiving, at a base station of a cellular network, a non-access stratum (NAS) message from a user equipment (UE);
determining, at the base station, that a message type of the NAS message is an evolved packet system session management (ESM) data transport that carries user plane data;
based on determining that the message type of the NAS message is the ESM data transport that carries user plane data, generating, at the base station, a packet that includes at least a portion of the NAS message;
based on determining that the message type of the NAS message is the ESM data transport that carries user plane data, setting, at the base station, a Differentiated Services Code Point (DSCP) marking of the packet that indicates the packet includes the portion of NAS message that is the ESM data transport that carries user plane data; and transmitting, by the base station, the packet that includes the DSCP marking that indicates the packet includes the portion of NAS message that is the ESM data transport that carries user plane data and that indicates a priority of the packet over a packet network to a mobility management element (MME) of the cellular network that authenticates UEs in the cellular network.

8. The computer-implemented method of claim 7, wherein the MME is a control plane component that tracks positions of UEs in the cellular network.

9. The computer-implemented method of claim 7, wherein the message from the UE is received over a low power wide area network.

10. The computer-implemented method of claim 9, wherein the low power wide area network is a narrow band wireless network.

11. The computer-implemented method of claim 7, comprising:
receiving, at the base station, an additional message from the UE;
determining, at the base station, that the additional message includes control plane data;
generating, at the base station, an additional packet that includes at least a portion of the additional message;
based on determining that the additional message includes control plane data, setting, at the base station, an additional DSCP marking of the additional packet that indicates the additional packet includes control plane data; and
transmitting, by the base station, the additional packet that includes the additional DSCP marking that indicates the additional packet includes control plane data and that indicates a priority of the additional packet over the packet network to the MME of the cellular network that authenticates UEs in the cellular network.

12. The computer-implemented method of claim 7, comprising:
receiving, at the base station, an additional NAS message from the UE;
determining, at the base station, that a message type of the additional NAS message is an Attach Request that indicates that the additional NAS message includes control plane data;
based on determining that the message type of the additional NAS message is the Attach Request that indicates that the additional NAS message includes control plane data, generating, at the base station, an additional packet that includes at least a portion of the additional NAS message;
based on determining that the message type of the additional NAS message is the Attach Request that indicates that the additional NAS message includes control plane data, setting, at the base station, an additional DSCP marking of the additional packet that indicates the packet includes the portion of the additional NAS message that is the Attach Request that carries the control plane data; and
transmitting, by the base station, the additional packet that includes the DSCP marking that indicates the additional packet includes the portion the additional NAS message that is the Attach Request that caries the control plane data and that indicates a priority of the additional packet over the packet network to the MME of the cellular network that authenticates UEs in the cellular network.

13. A computing device comprising:
one or more processors; and
a non-transitory computer-readable medium storing a plurality of computer-executable instructions that are executable by the one or more processors to perform a plurality of actions, the plurality of actions comprising:
generating a non-access stratum (NAS) message for a user equipment (UE) at a mobility management element (MME) of a cellular network that authenticates UEs in the cellular network;
determining that a message type of the NAS message is an evolved packet system session management (ESM) data transport that carries user plane data;
based on determining that the message type of the NAS message is the ESM data transport that carries user plane data, generating a packet that includes at least a portion of the NAS message;
based on determining that the message type of the NAS message is the ESM data transport that carries user plane data, setting a Differentiated Services Code Point (DSCP) marking of the packet that indicates the packet includes the portion of NAS message that is the ESM data transport that carries user plane data; and
transmitting the packet that includes the DSCP marking that indicates the packet includes the portion of NAS message that is the ESM data transport that carries user plane data and that indicates a priority of the packet as user plane data over a packet network to a base station of the cellular network in transit to the UE.

14. The computing device of claim 13, wherein the MME is a control plane component that tracks positions of UEs in the cellular network.

15. The computing device of claim 13, wherein the message from the UE is received over a low power wide area network.

16. The computing device of claim 15, wherein the low power wide area network is a narrow band wireless network.

17. The computing device of claim 13, wherein the actions comprise:
generating an additional message for the UE at the MME;
determining that a message type of the additional message includes control plane data;
based on determining that the message type of the additional message includes control plane data, generating an additional packet that includes at least a portion of the additional message;
based on determining that the message type of the additional message includes control plane data, setting an additional DSCP marking of the additional packet that indicates that the additional packet includes control plane data; and
transmitting the additional packet that includes the additional DSCP marking that indicates the additional packet includes control plane data and that indicates a priority of the additional packet over the packet network to a base station of the cellular network in transit to the UE.

18. The computing device of claim 13, wherein the actions comprise:
generating an additional NAS message for the UE at the MME;

determining that a message type of the additional NAS message is an Attach Request that indicates that the additional NAS message includes control plane data;

based on determining that the message type of the additional NAS message is an Attach Request that indicates that the additional NAS message includes control plane data, generating an additional packet that includes at least a portion of the additional NAS message;

based on determining that the message type of the additional NAS message is an Attach Request that indicates that the additional NAS message includes control plane data, setting an additional DSCP marking of the additional packet that indicates that the additional packet includes control plane data; and transmitting the additional packet that includes the additional DSCP marking that indicates the additional packet includes control plane data and that indicates a priority of the additional packet over the packet network to the MME of the cellular network that authenticates UEs in the cellular network.

* * * * *